April 26, 1960
F. S. YOUNG
2,934,361
FLUID PRESSURE OPERATED RETAINING MEANS
FOR PIPE CONNECTING UNITS
Filed March 31, 1955
3 Sheets-Sheet 1
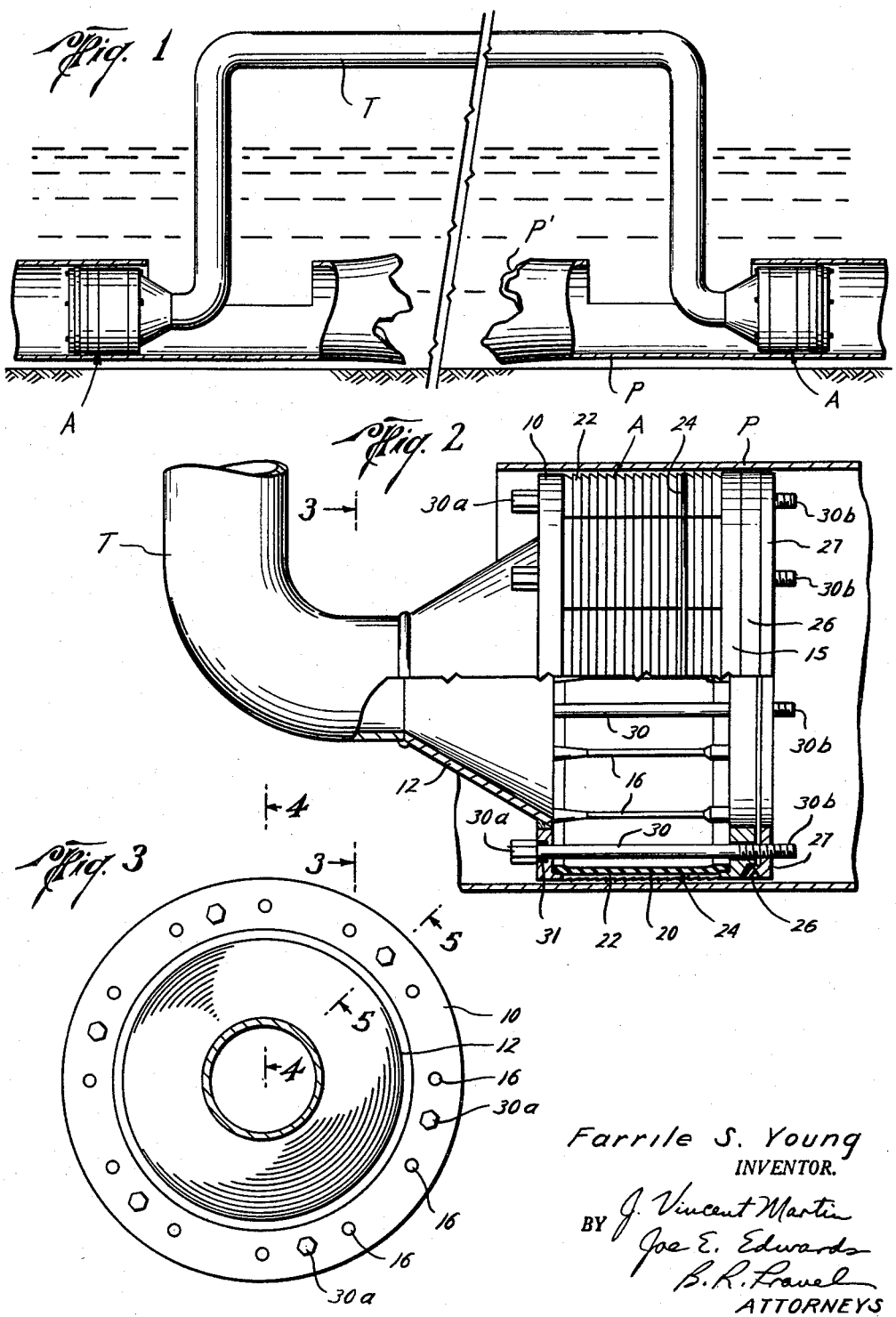
Farrile S. Young
INVENTOR.
BY J. Vincent Martin
Joe E. Edwards
B. R. Travel
ATTORNEYS

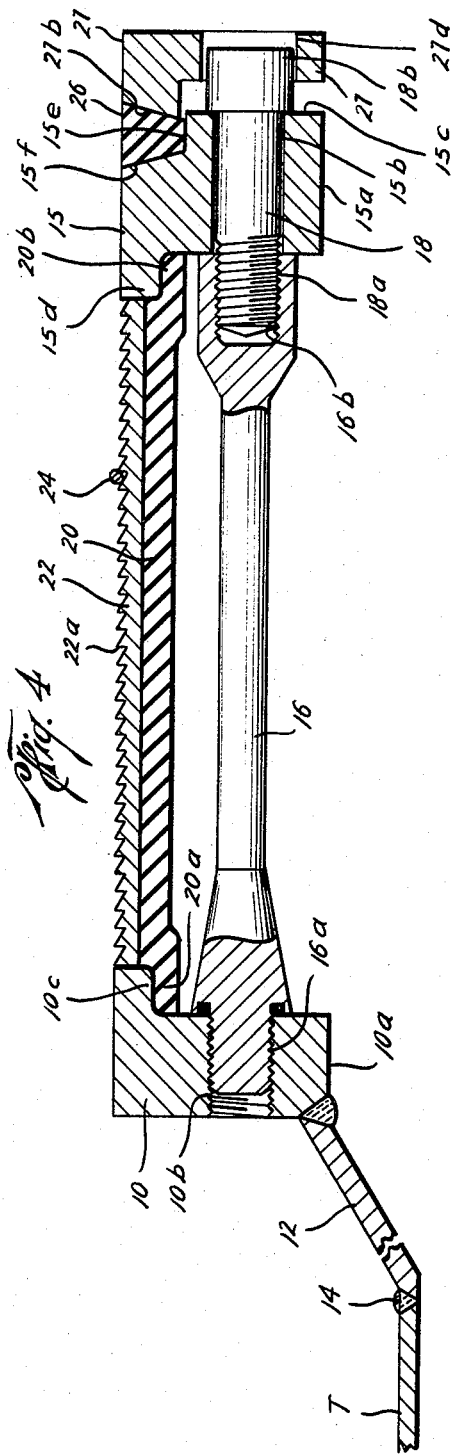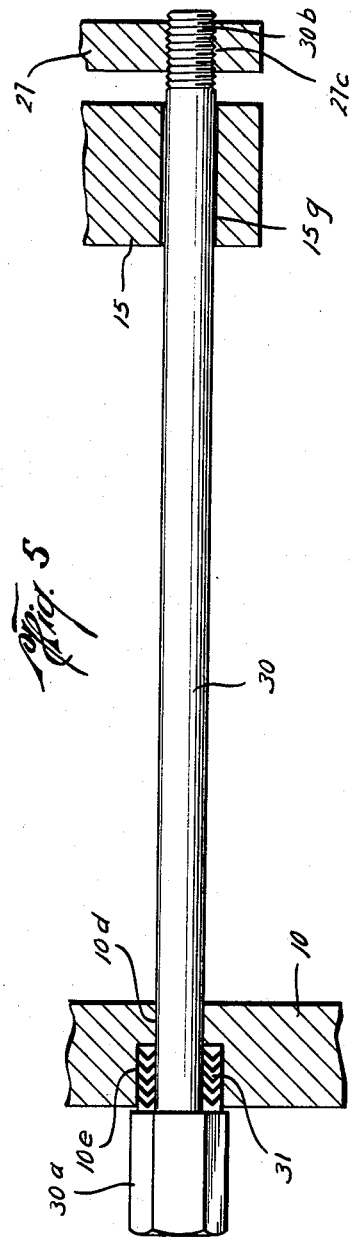

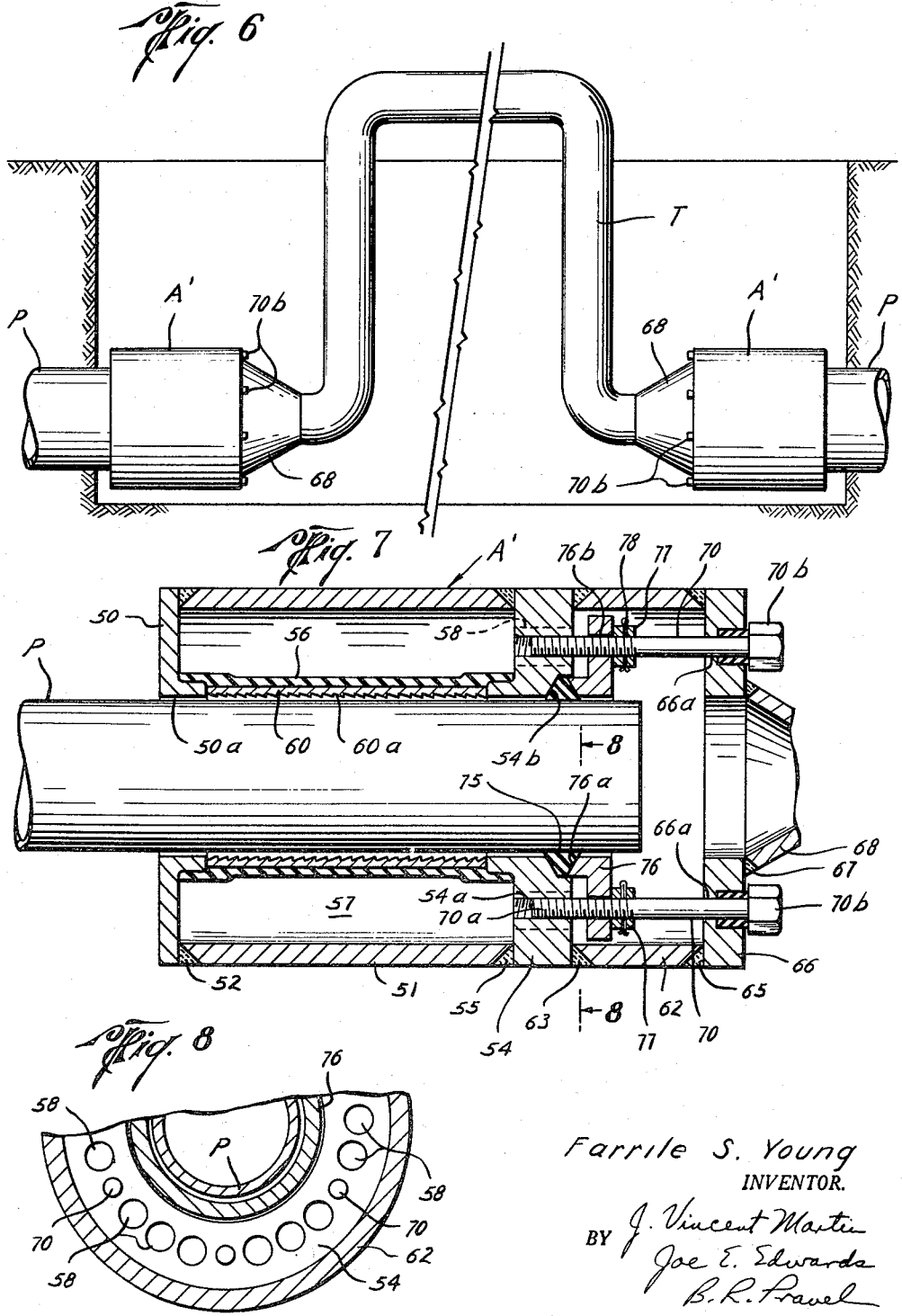

2,934,361

FLUID PRESSURE OPERATED RETAINING MEANS FOR PIPE CONNECTING UNITS

Farrile S. Young, Houston, Tex., assignor to Gulf Interstate Engineering Company, Houston, Tex., a corporation of Delaware Application March 31, 1955, Serial No. 498,283

4 Claims. (Cl. 285—306)

This invention relates to new and useful improvements in units for connecting to pipes.

An object of this invention is to provide a connector or plug unit which is adapted to be connected to a pipe by a fluid-expansible gripping means.

An important object of this invention is to provide a new and improved unit which is adapted to be connected to a section of a pipe by a gripping means which is actuated by the fluid pressure in said section of pipe whereby the forces exerted on said section of pipe by said unit are no greater than the forces exerted by said fluid pressure on said section of pipe.

Another object of this invention is to provide a new and improved connector or plug unit which is adapted to be connected to an end of a pipe and which has means therewith for effecting a pressure-tight fluid seal with the pipe, such means being operable from outside of the pipe to effect said seal.

Another object of this invention is to provide an improved unit which is suitable for connecting sections of pipe together or for use as a plug, wherein such unit is so constructed that a seal with the pipe is initially obtained by mechanical manipulation so that thereafter the fluid pressure within the pipe can be utilized for urging gripping means of the unit into gripping engagement with the pipe to connect the unit to the pipe.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a view, partly in elevation and partly in section, illustrating the unit of this invention in use for establishing an emergency connection between the ends of a damaged section of a pipe line.

Figure 2 is a view, partly in elevation and partly in section, illustrating one form of the connector or plug unit of this invention.

Figure 3 is a view taken on line 3—3 of Figure 2.

Figure 4 is a sectional view taken on line 4—4 of Figure 3.

Figure 5 is a sectional view taken on line 5—5 of Figure 3.

Figure 6 is a view similar to Figure 1, but illustrating the connection of sections of pipe together with a modified connector or plug unit at each end of the sections of pipe being connected together.

Figure 7 is a view, partly in elevation and partly in section, illustrating the details of the modified connector or plug unit illustrated in Figure 6.

Figure 8 is a sectional view taken on line 8—8 of Figure 7.

In the drawings, the letter A designates generally the connector or plug unit of this invention which is adapted to be connected to a section of pipe P. As will be explained, the connector or plug unit A has therewith a fluid-expansible gripping means which is adapted to be urged into gripping engagement with the section of pipe P by the fluid pressure which is within the pipe P. Although the connector or plug unit A of this invention has numerous uses, the use of the connector or plug unit A for establishing a temporary connection between adjacent sections of a pipe P which has suffered damage due to a pressure blowout or other cause is believed to be one of the most important uses thereof. Such use is illustrated in Figure 1 wherein a pair of the units A are used as connectors for connecting together sections of the pipe P to span the gap in the pipe P caused by the blowout area P'. With the units A in the position shown in Figure 1, a connecting tube or temporary pipe T extends from one connector unit A to the other connector unit A so that fluid can flow through the main pipe P and temporarily bypass the blowout area P'.

Considering now the details of one form of the unit of this invention which is shown in Figures 1–5, such unit A is illustrated for use as a connector in a section of pipe. The unit A is adapted to fit within the end of a section of the pipe P and it is formed with a back plate 10 which is in the form of a ring to which is welded or otherwise secured a cone 12. The cone 12 is welded at 14 or is otherwise suitably secured to the section of tubing or temporary pipe T, which as previously explained, extends to and connects with a corresponding unit A at the other end thereof.

The back plate or ring 10 is connected with a front plate or ring 15 which has a bore 15a of substantially the same inner diameter as the bore 10a of the front ring 10. The connection between the rings 10 and 15 is effected by spreader or spacer bolts 16, each of which has a threaded pin 16a on one end thereof for fitting into internally threaded openings 10b which are spaced circumferentially around the ring 10. The other end of each of the bolts 16 is provided with a threaded box 16b which receives a retaining bolt 18.

Each of the bolts 18 extends through an opening 15b, which openings are circumferentially spaced and extend through the ring 15. Thus, the threaded inner ends 18a of the bolts 18 fit within the threaded boxes 16b of the bolt 16 in threaded engagement therewith so that when the head 18b is in contact with the front surface 15c of the ring 15, the spreader or spacer bolts 16 are firmly secured to the ring 15.

An annular expander ring or sleeve 20, which is formed of rubber or other similar elastic resilient material, is positioned between the front ring 15 and the rear ring 10 and is maintained in a fixed position relative thereto by means of the annular lips or flanges 10c and 15d which extend inwardly toward each other and engaged with the outer ends 20a and 20b of the expansible sleeve 20 so as to prevent shifting of the sleeve 20 with respect to the rings 10 and 15. However, the ring 20 is still free to expand radially outwardly under the action of internal fluid pressure without becoming disengaged or separated from its position between the rings 10 and 15, as will be more fully explained hereinafter. The sleeve 20 supports a plurality of arcuate gripping elements or segments 22, each of which has a plurality of gripping teeth 22a which project or extend toward the rear ring 10. Such gripping elements 22 are adapted to move radially outwardly with the sleeve 20 as it is expanded radially outwardly by fluid pressure. Initially, such gripping elements 22 may be held in place on the sleeve 20 by a wire or other frangible element 24 which completely encircles the sleeve 20 and binds all of the gripping elements 22 thereon (Figure 2).

The front ring 15 has an annular notch 15e which has an inclined lateral surface 15f for receiving an annular sealing member or ring 26 which is formed of rubber or other resilient elastic material. Such sealing member 26 is adapted to be spread or expanded radially into sealing engagement with the inside of the pipe P by means of a spreader ring 27 which has a bore 27a of substantially the same internal diameter as the bore 15a of the front ring 15. The spreader ring 27 has a wedge surface 27b which is inclined at a substantially equal and opposite angle to the inclined annular surface 15f whereby longitudinal movement of the spreader ring 27 toward the front ring 15 effects a squeezing or expansion of the sealing member 26 outwardly into sealing contact with the inside of the pipe P.

For effecting such longitudinal movement of the spreader ring 27 toward the front ring 15, actuating bolts 30 are provided. Such bolts 30 are circumferentially spaced (Figure 3) and extend through openings 10d in the back ring 10 and through similar openings 15g in the front ring 15 (Fig. 5). Each of the actuating bolts 30 has a head 30a thereon which is so positioned that it is accessible from the exposed end of the section of pipe P in which the unit A is mounted. A recess 10e is preferably provided with a packing 31 for sealing of fluid flow around each bolt 30. At the opposite end of each bolt 30 from the head 30a, external threads 30b are provided and such threaded portions extend into correspondingly internal threaded openings 27c in the spreader ring 27. It should also be noted that openings 27d are provided in the spreader ring 27 for the heads 18d of the bolts 18 so that as the ring 27 is moved longitudinally relative to the ring 15 and the bolts 18, the head 18b does not interfere with such movement. Upon a rotation of the bolts 30, the bolts are threaded into the threaded openings 27c of the spreader ring 27 so as to move same toward the ring 15. Such movement, as previously pointed out, effects a wedging or radial expansion of the sealing member 26 outwardly into engagement with the pipe P. Since the heads 30a of the bolts 30 are accessible from the exposed end of the pipe P, they can be readily manipulated after the unit A has been positioned within the pipe P. As soon as the sealing contact is obtained between the seal ring 26 and the inside of the pipe P, thereafter all of the fluid pressure within the pipe P is directed against the inside of the unit A and such fluid pressure is then acting upon the inside of the expander sleeve 20 for moving the gripping members 22 into gripping engagement with the pipe P to hold the connector A in position within the pipe P.

From the foregoing it is believed evident that the operation or use of this unit A involves the initial actuation of the actuating bolts 30 with a wrench or other similar means connected to the bolt heads 30a so as to cause the expander or spreader ring 27 to move toward the ring 15 for urging the sealing member 26 into its sealing engagement wtih the inside of the pipe P. Thereafter, the fluid pressure acts from within the pipe P on the inside of the expander ring or sleeve 20 to urge the gripping members 22 radially outwardly. The string or wire 24 is, of course, broken by reason of the initial pressure from the fluid force acting on the expander sleeve 20 and thereafter the gripping members 22 move outwardly with the expansion of the sleeve 20. Since the teeth 22a extend toward the rear or back ring 10, the fluid force within the pipe tends to increase the gripping action of the gripping members 22 on the inside of the pipe P. Thus, the unit A is firmly held within the pipe P by the gripping contact of the gripping members or elements 22 with the inside of the pipe P. When it is desired to release the unit A from its connected position within the pipe P, the bolts 30 are reversed in their rotation by turning the bolt heads 30a in the opposite direction to that required for the tightening of the sealing member 26, so that such movement results in a release of the seal 26 with respect to its engagement with the inside of the pipe P. As soon as such sealing contact of the sealing member 26 with the pipe P is broken, then the internal pressure on the sleeve 20 is released so that the entire unit A can be withdrawn from the pipe P.

As previously pointed out, the preferred use of this invention involves the use of two of the units A in the position shown in Figure 1 wherein the temporary tubing or pipe T extends between the units A to form a temporary connection to bypass a blowout area P' of the pipe P.

In Figures 6–8, a modified form of the unit A of this invention is illustrated. Such unit is identified by the letter A' and it will be observed that the unit A' is particularly suitable for connecting around the external surface of the end of a pipe P. Such unit A' includes a front ring 50 which has a bore 50a of sufficient internal diameter to fit around the external surface of the pipe P. A rigid sleeve 51 formed of metal or a similar material is welded at 52 or is otherwise suitably connected to the ring 50a and also to a back ring 54 by welding, or other similar securing means 55. An expander sleeve 56 formed of rubber or other resilient material is disposed between the rings 50 and 54 and is of a lesser internal diameter than the sleeve 51 whereby an annular space 57 is formed between the sleeves 51 and 56. Such chamber 57 is in fluid communication with the interior of the pipe P by means of openings 58 provided in the back ring 54.

Within the expander sleeve 56, a plurality of arcuate gripping members or segments 60 which have gripping teeth 60a formed thereon extending toward the back ring 54 so that such teeth 60a are adapted to engage the external surface of the pipe P when urged radially inwardly toward same by the expansion of the expander sleeve 56.

A support sleeve 62 is welded at 63 to the ring 54 and is also welded at 65 to a support ring 66. Such support ring 66 has welded thereto at 67 a cone or connector section 68 which is welded or otherwise secured to the temporary pipe or tubing T (Figure 6). Actuator bolts 70 are spaced circumferentially with respect to the support ring 66 and extend through suitable openings 66a formed in the support ring 66 whereby the threaded ends 70a of the actuator bolts 70 are adapted to be threaded into the threaded openings 54a of the ring 54.

A sealing ring 75 formed of rubber or other resilient elastic material is positioned in a groove 54b of the ring 54 and is confined against movement from such groove 54b by reason of its contact with an inclined or wedge surface 76a of a spreader ring 76. Such spreader ring 76 is mounted on the actuator bolts 70 by reason of the bolts 70 extending through openings 76b therethrough, which openings are not threaded. In order to move the spreader ring 76 toward the ring 54 for spreading the sealing member or ring 75 into sealing contact with the external surface of the pipe P, a nut 77 is secured on the threaded portion 70a of each of the actuating bolts 70 by means of a cotter pin 78 or other suitable securing means, whereby upon rotation of each bolt 70, it is moved inwardly in the threaded opening 54a by the engagement of the threads 70a with the threads in the opening 54a and such inward movement of each bolt 70 likewise moves each of the nuts 77 inwardly. The inward movement of the nuts 70 causes a corresponding inward movement of the spreader ring 76. Preferably the inward movement of the bolts 70 is uniform, that is, substantially the same amount so that a uniform application of pressure to the spreader ring 76 is applied. The rotation of the bolts 70 is imparted by a wrench or similar tool applied to the bolt heads 70b which are exposed outside of the pipe P for ready access by such tools as a wrench.

In the operation or use of the form of the invention shown in Figures 6–8, wherein the unit A' is one which is adapted to be connected to the external surface of the end of a section of pipe P, such unit A' is simply inserted over the pipe P and then the bolt heads 70b are threaded so as to move inwardly or towards the ring 54. Such inward movement causes the ring 76 to move inwardly whereby the sealing member or ring 75 is radially expanded inwardly into sealing contact with the external surface of the pipe P. When the sealing contact has thus been obtained, the fluid pressure within the pipe P is then in communication with the interior of the chamber 57 so that the fluid pressure acts thereon to expand same radially inwardly. Such inward movement of the sleeve 56 also effects an inward radial movement of the gripping members 60 into gripping engagement with the external surface of the pipe P. Of course, it will be appreciated that ordinarily the fluid pressure is not present in the pipe P during the initial placing of the unit A' in position on the pipe P, as is also true in connection with the previously-described unit A. Instead, the sealing ring 75 is placed in sealing contact with the pipe P and then thereafter the valve or other control is open to admit the fluid pressure to the pipe P which then is transmitted to the expander sleeve 56 in the case of the unit A' and to the expander sleeve 20 in the case of the unit A.

When it is desired to release the unit A' from its position on the pipe P, the fluid pressure will ordinarily be released first and then the bolts 70 will be rotated by rotating the heads 70b thereof so as to release the pressure on the sealing element or members 75. In other words, the bolts 70 are moved away from the ring 54 and the inherent resiliency of the rubber or other material of which the ring 75 is formed causes the ring 76 to move toward the support ring 66. Thereafter, the gripping members 60 are released from their contact with the external surface of the pipe P since the fluid pressure no longer acts on the sleeve 56. With the gripping members 60 thus released, the entire unit A' can be removed.

The preferred use of the invention is illustrated in Figure 6 wherein the pair of the units A' are connected to ends of pipe sections with a temporary pipe or tubing T connecting the units A' together so that temporary or emergency flow from the ends of the pipe section can be maintained.

Although the invention has been described above in connection with the units A and A' for use primarily as connectors, such units can be used in other arrangements. For example, any arrangement wherein it is desired to connect to the end of a pipe and maintain the connection therewith by having the force of the connecting members substantially the same as the fluid pressure applied to that pipe, can utilize the advantages of this invention. The connector may also be a solid plug instead of having connection with the emergency pipe or tubing T. For example, the ring 10 in the unit A could be a solid plate and in the unit A', the support ring 66 could be a solid plate, except for the holes necessary for the bolts 30 and 70, respectively. Other uses will also occur to those skilled in the art.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A unit adapted to be connected near the open end of a pipe comprising, a pair of axially spaced ring shaped support means, a fluid conduit connected to one of the support means, an annular expander means mounted between said support means and having a wall one surface of which is exposed to pressure within the pipe, said wall adapted to be expanded toward a surface of the pipe by fluid pressure applied thereto, gripping means mounted on the opposite surface of said wall of said annular expander means for movement toward said surface of the pipe by said expander as it is expanded by the fluid pressure, the ends of said gripping means in abutment with said support means and slidable therebetween whereby said gripping means is moved into gripping contact with said surface to connect said unit to said pipe, and means operable by mechanical manipulation for providing a fluid seal with said surface of the pipe carried by one of said support means and isolating said opposite surface of said wall from pressure fluid within the pipe whereby fluid pressure in the pipe is exerted on the expander means for urging same into said gripping engagement.

2. The unit of claim 1 wherein the gripping means are mounted exteriorly of the expander means and the unit is adapted to be inserted into the bore of a pipe with which it is connected.

3. The unit of claim 1 wherein the gripping means are mounted on the interior of said expander means and the unit is adapted to fit over the exterior of a pipe with which it is connected.

4. A unit adapted to be connected near the open end of a pipe, comprising a pair of axially spaced ring-shaped support means, an annular expander means mounted between said support means and having a wall one surface of which is exposed to pressure within the pipe, said wall adapted to be expanded toward a surface of the pipe by fluid pressure applied thereto, means associated with one of said support means to admit pressure fluid carried by said pipe to said one wall of said expander means, the opposite wall of said expander means being exposed to ambient pressure, gripping means mounted on the opposite surface of said wall of said annular expander means for movement toward said surface of the pipe by said expander as it is expanded by the fluid pressure, the ends of said gripping means in abutment with said support means and slidable therebetween, whereby said gripping means is moved into gripping contact with said surface to connect said unit to said pipe, and means operable by mechanical manipulation for providing a fluid seal with said surface of the pipe carried by one of said support means and isolating said opposite surface of said wall from pressure fluid within the pipe whereby fluid pressure in the pipe is exerted on the expander means for urging same into said gripping engagement.

References Cited in the file of this patent

UNITED STATES PATENTS

| | | |
|---|---|---|
| 1,391,456 | Broschart | Sept. 20, 1921 |
| 1,808,162 | Frantz | June 2, 1931 |
| 2,047,569 | Loomis | July 14, 1936 |
| 2,197,450 | Curtis | Apr. 16, 1940 |
| 2,299,116 | Svirsky | Oct. 20, 1942 |
| 2,321,778 | Stout | June 15, 1943 |
| 2,413,997 | Rosa | Jan. 7, 1947 |
| 2,451,354 | Ohls | Oct. 12, 1948 |
| 2,481,013 | Henderson | Sept. 6, 1949 |
| 2,674,199 | Page | Apr. 6, 1954 |
| 2,691,418 | Connolly | Oct. 12, 1954 |